United States Patent [19]

Plamper

[11] 4,229,994
[45] Oct. 28, 1980

[54] STEERING WHEEL MOUNTING

[75] Inventor: Gunter Plamper, Brunswick, Ohio

[73] Assignee: MTD Products Inc, Cleveland, Ohio

[21] Appl. No.: 926,408

[22] Filed: Aug. 21, 1978

[51] Int. Cl.² ............................................. G05G 1/12
[52] U.S. Cl. ............................................... 74/552
[58] Field of Search ...................... 74/552, 553, 492; 403/259, 383; 292/348, 355

[56] References Cited

U.S. PATENT DOCUMENTS

| | | | |
|---|---|---|---|
| 1,720,142 | 7/1929 | O'Connor | 74/552 |
| 1,804,993 | 5/1931 | Kraft | 74/552 |
| 1,958,165 | 5/1934 | Le Compte | 74/553 |
| 3,548,676 | 12/1970 | Breitschwerdt | 74/552 |

Primary Examiner—Kenneth Dorner
Attorney, Agent, or Firm—Woodling, Krost & Rust

[57] ABSTRACT

A mounting for a vehicle steering wheel upon a steering shaft for secure connection therebetween and wherein the wheel of molded plastic resin is susceptible of having its hub expanded or fractured by a wedging action upon being fastened to the shaft, in which a reinforcing metal washer is molded in the wheel hub to resist such expansion or fracturing of the hub by the shaft and to improve the non-rotational interlocking between wheel and shaft.

3 Claims, 6 Drawing Figures

STEERING WHEEL MOUNTING

An object of the invention is to improve the mounting of a steering wheel of a material susceptible to being expanded or fractured by a wedging action imparted to the hub by a shaft inserted in the hub in such a manner as to resist such expansion or fracturing.

Another object is to provide a reinforcement to the hub of a wheel at a location where the hub is subjected to a wedging action by the hub being mounted on the upper end portion of a steering shaft of a vehicle.

Another object is the improvement of a non-rotational interlock between a molded resin steering wheel and shaft by a metal washer embedded in the wheel positioned to provide a metal-to-metal engagement with the shaft.

Another object is the provision of a reinforcing metal washer embedded in the hub of a molded plastic wheel for improving both the strength of the wheel hub accomodating the steering shaft of a vehicle and for improving the non-rotational interlock between the wheel and the shaft.

Other objects and a fuller understanding of this invention may be had by referring to the following description and claims, taken in conjunction with the accompanying drawings in which:

Figure 1:
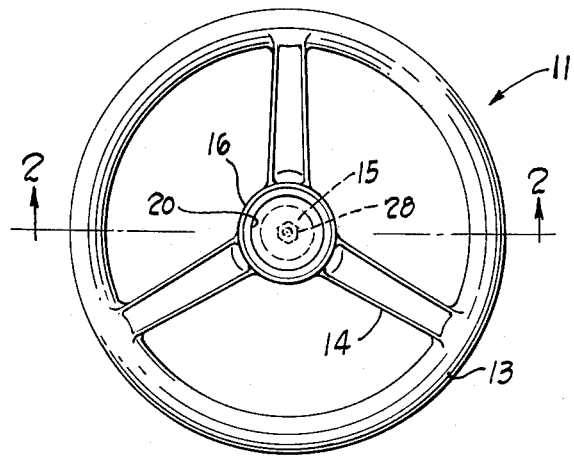
FIG. 1 is a plan view of a steering wheel mounted on a vehicle steering shaft in accordance with my invention.

The mounting is particularly adapted for the mounting of a steering wheel to the upper end portion of a steering shaft of a vehicle, such as a tractor, riding lawn mower, and the like, whereby turning of the wheel rotates the shaft on its axis for steering the vehicle. The wheel in common practice is made of a molded plastic resin such as polypropylene or other sturdy readily molded plastic.

The steering shaft is metal such as steel and adapted to steer a vehicle upon rotation of the shaft by the turning of a wheel interlocked with the shaft.

In the drawing, the wheel is generally designated by the reference character 11. The steering shaft upon which the wheel is mounted is generally designated by the reference character 12.

The wheel 11 has a rim 13 carried in the usual manner on the outer ends of spokes 14 radiating from a hub 15. Extending around, and spaced from, the hub 15 is a skirt 16. An upper wall 17 near the upper side of the hub extends across between the hub 15 and skirt 16. A round hole 17A extends through the wall 17 at the axis of the hub 15.

Above the wall 17 is a dwell 18. This dwell 18 is closable by a disk 20, seen in FIG. 2, inserted in the dwell to hide the contents thereof and for improvement of the appearance.

Extending between the hub 15 and skirt 16 below the upper wall 17 are three equidistantly spaced bracing walls 26. Depending down from each these walls 26 is a spacing lug 27 utilized in the positioning of the wheel.

Figure 3:
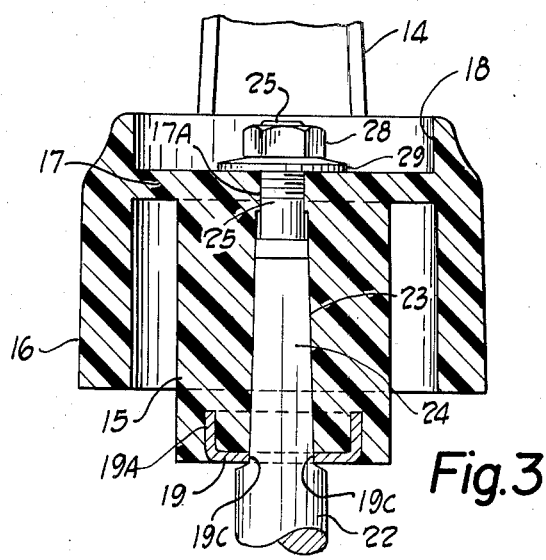
FIG. 3 is a sectional view, enlarged from the scale shown in FIGS. 1 and 2, taken in a plane coinciding with the axis of the wheel and shaft, showing the detail of the mounting of the wheel on the shaft, only the portion of the wheel at the hub being shown.
Figure 2:
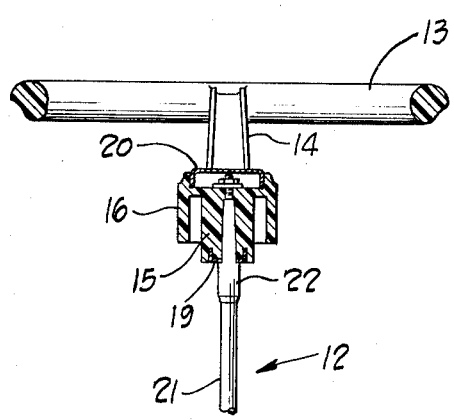
FIG. 2 is a cross-sectional view of the mounting arrangement shown in FIG. 1 and taken along the line of 2—2 of FIG. 1.
Figure 4:
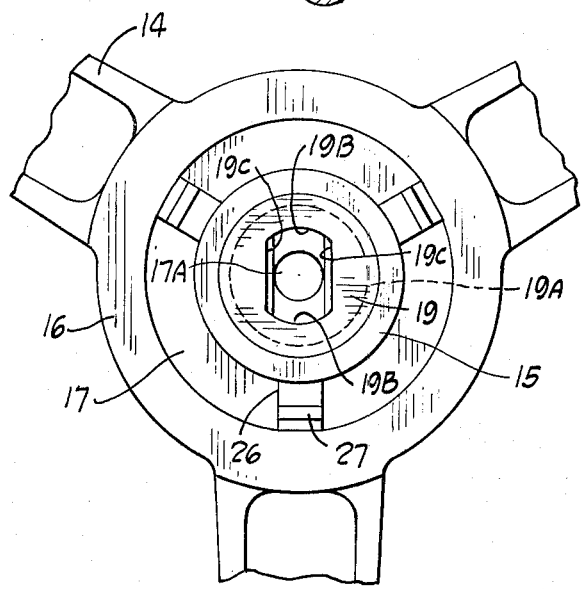
FIG. 4 is a view, on the scale of FIG. 3, looking up at the bottom side of the wheel in the region of the hub prior to the mounting of the wheel on a shaft.

The hub 15 has a central opening extending axially thereof from the lower side of the hub, as seen in FIGS. 2 and 3, to the round hole 17A in wall 17. This central opening has two opposed flat walls and alternately with these opposed flat walls are two opposed round walls. As seen in FIG. 3, the two opposed flat walls are tapered, that is they are gradually inclined toward each other as they extend upwardly toward the upper side of the hub. The said central opening in the hub is in axial alignment with, and communicates with the round hole 17A. The opposed round walls of the said central opening generally coincide with a phantom cylindrical form axially disposed of the hub.

The shaft 12 has a main body 21 of cylindrical or rod-like configuration adapted to be connected by suitable linkage, not shown, with the steering mechanism of a vehicle. The shaft 12, by a forging operation, is enlarged at a location above the body 21 to form the shoulder portion 22 as better illustrated in FIGS. 5 and 6.

Above the shoulder portion 22 the shaft 12 is forged or otherwise formed to provide the upper end portion of the shaft. This upper end portion has two oppositely disposed flat sides 23 and two oppositely round sides 24 which are alternately disposed relative to the flat sides around the circumferential extent of the upper end portion of the shaft.

Figure 5:
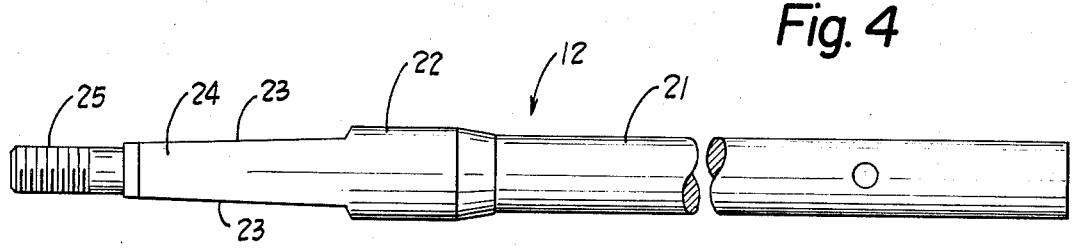
FIG. 5 is a side view of a steering shaft utilized in my mounting, on the same scale as FIGS. 3 and 4, and turned on its axis to show both of two opposite flat sides tapered toward the upper end portion of the shaft.
Figure 6:
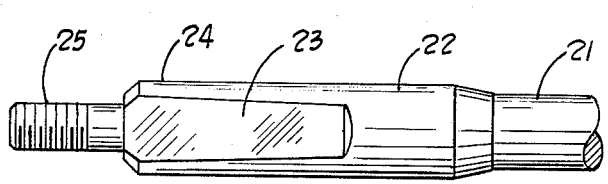
FIG. 6 is a view of the shaft similar to the view of FIG. 5 but in which the shaft has been rotated 90° on its axis to show but one of its two opposite flat sides.

As better seen in FIGS. 2, 3, and 5, the two opposed flat sides 23 are tapered in that they are progressively inclined toward each other as they extend upwardly from the shoulder portion 22 toward the upper free end of the shaft 12. The round sides 24 of the shaft end portion generally coincide with a phantom cylindrical form axially disposed of the shaft.

At the upper free end of the shaft in cylindrical form it is threaded to provide the threaded round end 25. A nut 28 is threadably engaged to the threaded end portion 25 after the shaft is mounted within the hub, as shown in FIGS. 1, 2, and 3. A cup-shaped spring washer 29 is positioned between the nut 28 and top wall 17 of the wheel to hold the nut tightly in position.

Embedded in the plastic material of the hub 15 at the entrance to the central opening therein at the lower side of the hub is a cup-shaped washer 19 of metal, preferably of steel. This washer 19 has side walls 19A disposed in a general cylindrical form upwardly from the flat intermediate portion of the washer. These side walls 19A extend substantially parallel to the axis of the hub at a location disposed radially outward from the walls of the central opening in the hub and radially inward from the outer walls of the hub 15, as better seen in FIG. 3. The base or intermediate portion of the washer is disposed flush with the bottom side of the hub 15. As seen in FIGS. 2 and 3, the bottom surface of this base or intermediate portion of the washer 19 is disposed in the same horizontal plane as the bottom surface of the hub 15 at its lower side. The washer 19 is embedded in the plastic during the molding of the wheel and becomes part of the wheel.

By reason of the tapered opposed flat sides 23 of the tapered end portion of the shaft keyed to the tapered opposed flat walls of the said central opening in the hub when the parts are in the portion illustrated in FIGS. 2 and 3, the wheel and shaft are interlocked so that the shaft is rotated on its axis by the turning of the wheel on its axis.

Also by reason of the tapered disposition of the flat sides 23 of the shaft end portion which engage the flat walls of the central opening of the hub when the shaft end portion is moved upwardly into the central opening, there is a wedging action by the flat sides 23 pressing against the flat walls. This wedging action is particularly present when the taper of the flat walls of the central opening do not exactly coincide with the taper of the flat sides 23 of the shaft end portion throughout the length of the taper. In the absence of complete 100% coincidence of the taper of the side walls of the central opening in the hub with the taper of the flat sides 23 of the shaft end portion such wedging action can be significant.

The wedging action that may result, and often does not result in the absence of such precise coincidence of the engaging tapered surfaces, may be sufficient to expand to the point of fracturing the hub 15 and particularly at the lower side of the hub adjacent to the entrance to the central opening. Such expansion and resulting fracture produce a poor mounting of the wheel on the shaft, a looseness, and a misalignment or wobbling of the wheel relative to the shaft.

The washer 19 embedded in the hub as described reinforces the hub at the entrance to the central opening and resists such radially outward force imparted to the hub by the described wedging action. The expansion of the hub that could otherwise occur by the wedging action is limited and the fracturing to a great degree is generally eliminated by this reinforcing action of the washer 19 at the location where needed most.

The washer 19 has a central hole therein, this central hole being defined by two oppositely disposed curved edges 19B and two oppositely disposed straight edge 19C which are alternately disposed relative to the curved edges 19B. The curved edges 19B complement and are disposed outwardly of the cylindrical walls 24 of the shaft end portion in the same horizontal plane. The straight edges 19C complement and are disposed outwardly of the flat sides 23 of the shaft end portion in the same horizontal plane.

In this manner the washer 19 is keyed to the shaft end portion, and the washer 19 thus assists in keying of the hub and shaft together. Turning of the wheel is assisted by the washer keyed to the shaft in the rotation of the shaft by turning of the wheel. In this way the washer 19 not only acts to reinforce the hub against expansion but also assists in the keying of the wheel and shaft together.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vehicle having a rigid metal steering shaft, the shaft having an upper end portion, a steering wheel mounting structure for the mounting of a steering wheel to the said upper end portion of the said rigid metal steering shaft, the steering wheel being molded of plastic resin, said upper end portion of the shaft having opposed flat sides inclined inwardly toward each other progressively toward the upper end of the shaft, said upper end portion being threaded adjacent the upper end of the shaft for threaded interengagement with a nut, said steering wheel having a hub portion, the said hub portion having an upper side and lower side and having a central opening extending axially therethrough for receiving said upper end portion of the shaft upon insertion of the upper end portion of the shaft upwardly into the entrance of the opening at the lower side of the hub portion, the said opening having opposed flat walls inclined inwardly toward each other progressively toward the upper side of the hub complementing the said flat sides of said shaft end portion to engage the same closely, said flat sides of the shaft upper end portion interengaging with the flat walls of the hub for providing rotation of the shaft upon turning of the wheel, the interengagement of the opposed inclined flat sides of the shaft upper end portion with the opposed inclined flat walls of the central opening in the hub being such that, upon the drawing down of a nut threadably engaged with the threaded end portion of the shaft to impart a downwardly axially directed force on the hub toward the shaft, the said inclined flat walls of the said shaft end portion by a wedging action against the inclined flat walls of said recess exert an outwardly directed radial force tending to expand the wheel hub surrounding said opening, the improvement of a cup-shaped metal washer embedded in said wheel hub adjacent the said entrance into said central opening, said washer having a substantially flat central base portion and side walls extending upwardly from the periphery of said base portion, said washer having a bore complementing the cross-sectional shape of said end portion of the shaft in a plane transverse of said end portion of the shaft at said entrance of the opening, the base portion of the washer being disposed in the said hub portion at the lower side thereof in position to engage said upper end portion of the shaft, the side walls of the cup-shaped washer extending into the wheel hub outwardly of the said opening, the said washer embedded in the wheel hub resisting the said wedging action tending to expand the wheel hub, the said bore in said washer having oppositely disposed flat edge portions for interengaging with the opposed flat sides of the shaft end portion to interlock therewith against rotational movement of the washer relative to the shaft.

2. In a vehicle having a steering wheel of molded plastic and a metal steering shaft, the wheel having a hub and a central opening in the hub thereof and the steering shaft having an upper end portion, the mounting of said steering wheel to the said upper end portion of the metal steering shaft, in which the upper end of the shaft and the central opening in the wheel hub in which the upper end portion of the shaft is inserted have opposed tapered surfaces tending to exert a radially outwardly directed expansive force on the wheel hub upon the wheel hub being moved in downward axial direction relative to the said end portion of the shaft, the improvement of a cupped reinforcing metal washer embedded in the wheel hub adjacent the lower entrance to the central opening of the hub, the washer having a bore for accommodating therein the upper end portion of the shaft inserted into the opening, the washer having a substantially flat base portion disposed in the hub at the lower side thereof and positioned to embrace in nonrotative engagement therewith the said upper end portion of the shaft, and having side walls extending upwardly from the periphery of said base portion, the side walls of the washer extending upwardly into the hub at a radial distance from the opening and parallel to the axis of the hub to embrace the portion of the hub adjacent the lower entrance of the opening to resist said radially directed expansive force on the hub, the end portion of the shaft inserted in the opening in the hub having opposed flat sides, and the bore in said washer having opposed flat internal edges to provide a key-way for the opposed flat sides of the shaft end portion inserted in said opening for locking the washer with the wheel hub against rotational movement relative to the shaft.

3. In a vehicle having a steering wheel of molded plastic and a metal steering shaft, the wheel having a hub and a central opening in the hub thereof and the steering shaft having an upper end portion, the mounting of said steering wheel to the said upper end portion of the metal steering shaft, in which the upper end of the shaft and the central opening in the wheel hub in which the upper end portion of the shaft is inserted have opposed tapered surfaces tending to exert a radially outwardly directed expansive force on the wheel hub upon the wheel hub being moved in downward axial direction relative to the said end portion of the shaft, the improvement of a cupped reinforcing metal washer embedded in the wheel hub adjacent the lower entrance to the central opening of the hub, the washer having a bore for accommodating therein the upper end portion of the shaft inserted into the opening, the washer having a substantially flat base portion disposed in the hub at the lower side thereof and positioned to embrace in nonrotative engagement therewith the said upper end portion of the shaft, and having side walls extending upwardly from the periphery of said base portion, the side walls of the washer extending upwardly into the hub at a radial distance from the opening and parallel to the axis of the hub to embrace the portion of the hub adjacent the lower entrance of the opening to resist said radially directed expansive force on the hub, the hub having concentric inner and outer walls and the said washer having side walls spaced from both the inner wall of the opening in the hub and from the outer wall of the hub defining and immediately surrounding said central opening, the said washer having a flat base portion intermediate said side walls, the flat base portion being disposed substantially flush with said lower side of the hub.

* * * * *